United States Patent
Naik et al.

(10) Patent No.: US 8,342,700 B2
(45) Date of Patent: Jan. 1, 2013

(54) WEAR AND IMPACT RESISTANT REFLECTIVE ROAD LANE MARKERS

(75) Inventors: Hemant A. Naik, Twinsburg, OH (US); Puneet Singh, Stow, OH (US); Ratanjit Sondhe, Chagrin Falls, OH (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/737,922

(22) PCT Filed: Sep. 11, 2009

(86) PCT No.: PCT/US2009/056642
§ 371 (c)(1),
(2), (4) Date: Sep. 9, 2011

(87) PCT Pub. No.: WO2010/036522
PCT Pub. Date: Apr. 1, 2010

(65) Prior Publication Data
US 2012/0092767 A1    Apr. 19, 2012

Related U.S. Application Data

(60) Provisional application No. 61/100,123, filed on Sep. 25, 2008.

(51) Int. Cl.
*G02B 5/124*    (2006.01)
*B32B 27/38*    (2006.01)

(52) U.S. Cl. ........ 359/540; 359/536; 359/539; 359/547; 116/63 R; 404/9; 404/14; 428/325; 428/413; 428/414; 428/908.8

(58) Field of Classification Search ......... 359/530–542, 359/546–547, 551; 404/9, 14; 116/63 R; 428/172, 325, 413, 414, 425.5, 425.8, 908.8, 428/913
See application file for complete search history.

(56) References Cited

U.S. PATENT DOCUMENTS 2,326,634 A * 8/1943 Gebhard et al. .............. 359/540
5,380,549 A    1/1995 Harvison
5,782,577 A    7/1998 Stephens

FOREIGN PATENT DOCUMENTS

WO    93/10167    5/1993

OTHER PUBLICATIONS

International Search Report and Written Opinion from related PCT application PCT/US2009/056642, dated Dec. 15, 2009, 14 pages.

* cited by examiner

*Primary Examiner* — James Phan
(74) *Attorney, Agent, or Firm* — Brooks, Cameron + Huebsch, PLLC

(57) ABSTRACT

A laminate article preferably including two or more layers adapted to be applied to a surface of a roadway that can function as a reflective marker, such as a lane marker or road feature marker. The article includes one or more reflective compounds, preferably particles, aggregates, or clusters that are partially embedded in an exposed outer surface layer of the article. In order to increase the durability of the material, protective media compounds are also present in the outer layer and extend outward therefrom with the protective material protruding a greater distance than the reflective compounds. The articles of the present invention are weather resistant, durable and resistant to damage by vehicles and snowplows.

16 Claims, 1 Drawing Sheet

WEAR AND IMPACT RESISTANT REFLECTIVE ROAD LANE MARKERS

This application is a National Stage application under 35 U.S.C. 371 of PCT/US2009/056642, and published as WO 2010/036522 on Apr. 1, 2010, which claims priority in part from U.S. Provisional Application Ser. No. 61/100,123 filed Sep. 25, 2008, the entire content of which is incorporated herein by reference.

FIELD OF THE INVENTION

The present invention relates to a laminate article preferably including two or more layers adapted to be applied to a surface of a roadway and can function as a reflective marker such as a lane marker or road feature marker. The article includes one or more reflective compounds, preferably particles, aggregates, or clusters, that are partially embedded in an exposed outer layer of the article. In order to increase the durability of the material, protective media compounds are also present in the outer layer of the article and extend outward therefrom so that the outer portion or ends thereof protrude a greater distance than the outermost portion or ends of the reflective compounds. The articles of the present invention are durable, resistant to damage by vehicles and snowplows, and also weather resistant.

BACKGROUND OF THE INVENTION

Roadway markers are used on or around roads to convey or display information, such as pavement markings, traffic lanes, road stripes or delineators, etc. Oftentimes, roadway markers include a reflective component so that motor vehicle drivers can clearly see the markers after dark. Reflective roadway markers have the ability to reflect some portion of incident light back towards the source from which the light originated. Motor vehicle headlamps are turned toward the road surface to illuminate, for example, the boundaries of traffic lanes for the motor vehicle driver.

It is known that roadway markers used on a road are subject to wear caused by traffic and other conditions. One manner in which roadway markers become damaged is by the wear caused by snowplow blades. Snowplow blades are designed to clear the roadway of snow and ice and, therefore, preferably continually engage the surface of the road. When a snowplow blade contacts a roadway marker, the blade can impact the marker and components thereof, such as reflective compounds, with sufficient force to break off some of the compounds or portions of the marker and also from the roadway. After a period of time, a sufficient number of reflective compounds can wear off so that reflectance provided by the roadway marker is significantly diminished.

Numerous different approaches have been attempted to provide roadway markers, some with the goal of preventing or minimizing impact by a snowplow blade or reduce wear from the tires of an automobile. Some of the approaches are described for example in U.S. Pat. Nos. 2,897,732; 3,030,870; 3,204,537; 4,758,469; 5,380,549; 5,660,497; 5,676,488; 5,759,928; 5,763,000; 5,782,577; 6,225,371; 6,247,818; 6,431,788; and 7,168,815.

For example, U.S. Pat. No. 6,431,788 relates to pavement marking and methods of making pavement markings in which the pavement markings reportedly exhibit wear resistance to, e.g., snowplow blades. The pavement markings include elongated protuberances in which successive elongated protuberances overlap along at least the longitudinal direction and may also overlap in a direction transverse to the longitudinal axis. Other protuberances are interspersed between the elongated protuberances to reportedly improve retro-reflectivity. The elongated protuberances are provided to reportedly support, e.g., a snowplow blade moving over the pavement marking.

In view of the prior art, there is still a need for an improved method for protecting roadway markers disposed on roadways from wear, such as from forces due to snowplow blades.

SUMMARY OF THE INVENTION

The present invention discloses reflective marker articles suitable for use on a roadway that are resistant to snowplow blades due to the inclusion of protective media compounds present on the outer surface of the article, preferably present in an amount that reduces wear of the article.

The articles of the present invention are composite laminates preferably formed of two or more cured layers, with each layer preferably applied and formed directly on a surface of the road or at least a portion of another layer of the article. The exposed upper layer or layers of the composite include both protective media compounds and reflective compounds.

Accordingly, it is an object of the present invention to provide articles and methods for preparing the articles, that can be applied to a roadway or the like in order to improve the brightness or visibility of a feature, due to the inclusion of reflective compounds that increases the visibility of the article for vehicle drivers travelling at night, and during adverse weather conditions. The articles also include protective media compounds exposed on an upper surface of the article that protects the article from wear caused by snowplows, vehicles, or the like.

It is a further object of the present invention to provide a durable, weather resistant, cured, reflective road lane marker that provides wet reflection and includes a raised surface layer when compared to at least a second surface of the article itself, with the raised surface layer including reflective compounds which are protected by the protective media compounds also present in the article.

A further object of the present invention is to provide an article having an upper surface with at least two different colors, preferably contrasting colors, in order to enhance visibility of the article on the roadway.

Accordingly, one aspect of the invention is a reflective marker laminate article comprising at least one base layer adapted to be applied to a substrate, said base layer being cured, said base layer comprising an epoxy resin, a polyurethane, a polyurea, a polyurethane-urea, a poly(vinyl ester), or a polyacrylic, or any combination thereof; one or more non-transparent binder layers in contact with and located on top of at least a portion of the base layer, said one or more binder layers being cured and comprising a polyurethane, a polyurethane-urea, a polyurea, a polyester, or a polyacrylic, or any combination thereof, with the proviso of said one or more binder layers being different than said base layer; and an exposed uppermost binder layer of said one or more binder layers having a plurality of protective media particles partially embedded therein, or said base layer portion having an exposed surface free of any binder layer thereon having a plurality of protective media particles partially embedded therein, or both, and said plurality of said protective media particles having an uppermost surface extending above an uppermost surface of said one or more binder layers.

A further aspect of the invention is a reflective marker laminate article, comprising: at least one base layer adapted to be applied to a substrate, at least one binder layer contacting an entire width of said base layer, or contacting less than the entire width of said base layer so that one lateral side of said base layer is exposed or both lateral sides of said base layer are exposed, the at least one binder layer having an exposed surface; protective media particles partially embedded in said at least one binder layer or partially embedded only in said one or both lateral exposed base layer sides; reflective particles partially embedded in said exposed binder layer; said base layer comprising an epoxy resin, a polyurethane, a polyurea, a polyurethane-urea, a poly(vinyl ester), or a polyacrylic, or any combination thereof; and said at least one binder layer comprising a polyurethane, a polyurethane-urea, a polyurea, a polyester, or a polyacrylic, or any combination thereof with the proviso of said at least one binder layer being different than said base layer.

BRIEF DESCRIPTION OF THE DRAWINGS

The invention will be better understood and other features and advantages will become apparent from the detailed description of the invention, taken together with the drawings, wherein.

DETAILED DESCRIPTION OF THE PREFERRED EMBODIMENTS

Figure 1:
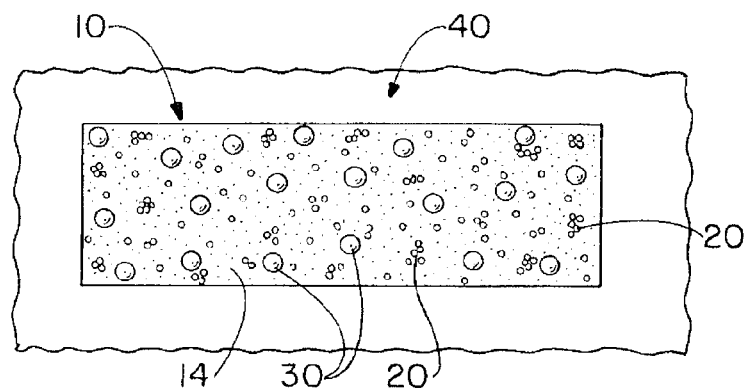
FIG. 1 is a top view of one embodiment of an article of the present invention including one preferred arrangement of protective media compounds and reflective compounds on a cured weather resistant binder layer that resides on a cured base layer.

The wear, weather, and impact resistant reflective roadway markers of the present invention include a base layer adapted to be applied to a roadway and one or more weather resistant binder layers applied on at least a portion of the base layer, with one or more of the binder layers including a protective media compound and reflective compounds in the same or different binder layers. The articles are generally formed by applying the base layer to a surface such as a roadway, including, but not limited to, asphalt, concrete, steel plate and composite materials; floors such as industrial floors; decks such as bridge decks or garage decks; and the like.

The cured base layer serves as an interface between the one or more binder layers and the substrate. The base layer is formulated to attain good adhesion with the substrate and the binder layers. In a highly preferred embodiment, the base layer is an epoxy composition. Other suitable polymers useful as the base layer include vinylester, polyester, acrylics (one example being polymethylmethacrylate), polyurethane, polyurea, a polyurethane-urea, or combination thereof.

The base layer composition desirably is a volatile-free system. By "volatile-free system" it is meant that the composition generally contains less than about 10 percent by weight of a volatile compound, desirably less than about 5 or about 3 percent by weight, and preferably no volatile at all, that is 0 percent, or completely free from a volatile that can be released from the composition. In the past, such volatiles have often resulted from the use of solvent. Thus, the composition is substantially free, or even 100 percent non-solvent at ambient temperature and upon cure is 100 percent solids. In other words, the term "volatile-free system" can be understood to be free from organic components that have a boiling point of less than about 48.9° C. (120° F.) and desirably less than about 65.6° C. (150° F.). This advantage results in a composition that is safer and more environmentally benign than prior art compositions. Despite this advantage, the composition has an appropriate viscosity to permit application such as by spraying.

Epoxy compositions are generally formed by or derived from the mixing of two components, a part "A" comprising an epoxy resin, and a part "B" comprising a hardener system. The epoxy resin is reacted with the hardener system. In the present invention, one or more epoxy resins can be used as the base resin with one or more optional epoxy modifiers and as well as other additives. In the present invention, the preferred hardener is one or more amine hardeners as will be further discussed in greater detail. Such hardeners include, for example, aliphatic, cycloaliphatic and aromatic amines, polysulfides, phenalkamines, polythiourethanes, polyaminomercaptans, mercaptans, polyamides, amido-amines, anhydrides and adducts; or mixtures thereof.

Examples of specific epoxy resins or polymers which can be utilized include but are not limited to polyhydric phenol polyether alcohols; glycidyl ethers of novolac resins such as epoxylated phenol-formaldehyde novolac resin; glycidyl ethers of mono-, di-, and trihydric phenols; glycidyl ethers of bisphenols such as diglycidyl ether of tetrabromobisphenol A; glycidyl ethers of polynuclear phenols; epoxy resin made from diphenolic acid; glycidyl ethers of aliphatic polyols such as chlorine-containing aliphatic diepoxy and polyepichlorohydrin; glycidyl esters such as aliphatic diacid glycidyl esters and epoxidized phenolphthalein; glycidyl epoxies containing nitrogen such as glycidyl amides and amide-containing epoxies; glycidyl derivatives of cyanuric acid; glycidyl resins from melamines; glycidyl amines such as triglycidyl ether amine or p-aminophenol and bis(2,3-epoxypropyl)methylpropylammonium p-toluenesulfonate; glycidyl triazines; thioglycidyl resins such as epoxidized bisulfide; silicon-glycidyl resins such as 1,4-bis[(2,3-epoxypropoxy)dimethylsilyl]; and fluorine glycidyl resins. Other epoxy resins which can be used include those which are synthesized from mono-epoxies other than epihalohydrins including epoxy resins made from unsaturated monoepoxies such as polyallyl glycidyl ether and glycidyl sorbate dimer; epoxy resins from monoepoxy alcohols; epoxy resins from monoepoxies by ester interchange; epoxy resins from glycidaldehyde; polyglycidyl compounds containing unsaturation such as allyl-substituted diglycidyl ether of bisphenol A; epoxy-resin adducts of the above; and epoxy resins which are synthesized from olefins and chloroacetyls such as butadiene dioxide, vinylcyclohexane dioxide, epoxidized polybutadiene, and bis(2,3-epoxy-cyclopentyl)ether. A more comprehensive list of epoxy resins can be found in *Handbook of Epoxy Resins*, by Henry Lee and Kris Neville, McGraw-Hill, Inc., 1967, which is hereby incorporated by reference, as is; and in "Epoxy Resins" by Ha. Q. Pham and Maurice J. Marks in *Ullmann's Encyclopedia of Industrial Chemistry*, Wiley-VCH Verlag GmbH & Co. KGaA, 2006.

The various epoxy resins or polymers which are generally applicable to the present invention as the base epoxy resin have a number average molecular weight of from about 300 to about 5,000, and preferably from about 320 to about 390. The various epoxy polymers useful for the basic epoxy resin generally are difunctional, that is, they have two epoxide groups typically at the terminal portions thereof.

A highly preferred base epoxy resin is diglycidyl ether of bisphenol A (DGEBA) which has the following formula:

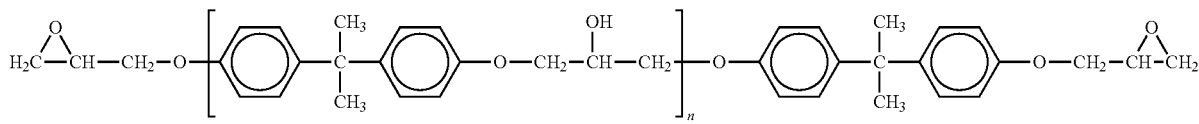

wherein n is 0 or a number from about 0.1 to about 18, desirably from about 0.1 to about 5, and preferably from about 0.1 to about 3.

More particularly, the base epoxy resin useful for the present invention comprises a bisphenol A type resin, or a blend of bisphenol A resin and epichlorohydrin having a weight per epoxide ranging from about 175 to about 250, and more preferably from about 180 to about 195. This resin has a viscosity at 25° C. (77° F.) of from about 6 Pa·s (6,000 centipoise) to about 18 Pa·s (18,000 centipoises), and more preferably from about 11 Pa·s (11,000 centipoises) to about 16 Pa·s (16,000 centipoise) and most preferably from about 11 Pa·s (11,000 centipoise) to about 14 Pa·s (14,000 centipoise). The resin should have a color APHA of from about 0 or about 1 to about 200.

The epoxy resin can be used with one or more modifiers such as, for example, a diluent, and/or a filler. Desirably diluents are reactive with the epoxy resins, reduce the viscosity thereof, and modify the epoxy to make it more flexible. Broadly, these diluents should have an epoxide equivalent weight range of from about 120 to about 325. In the present invention it is preferable to use an alkyl glycidyl ether as the diluent with a suitable range being from 2 to about 20 carbon atoms in the alkyl portion. More preferably, the alkyl portion contains from 3 to about 10 carbon atoms, with butylglycidyl ether being most preferred. Alternatively, the diluent may be a diepoxide such as butyldiglycidyl ether, preferably having a weight per epoxide equivalence of from about 120 to about 220, and more preferably from about 130 to about 260. Other diluents which are applicable in the present invention include cresyl diglycidyl ether having a weight equivalence of from about 160 to about 210, and more preferably from about 170 to about 195. In addition, epoxide fractions of $C_2$ to $C_{20}$ are useful with two specific fractions being in the range of $C_8$ to $C_{10}$ and in the range of $C_{12}$ to $C_{14}$ could be used. In addition, 2-ethylhexylglycidyl ether could be used.

In accordance with the present invention, the diluent is used in an amount sufficient to lower the viscosity of the epoxy resin to an appropriate number and will therefore of course depend upon the base resin used. A desired viscosity range as used in the present invention for the one or more epoxy resins, one or more modifiers, and one or more hardeners such as for spraying is from about 2 Pa·s (2,000 centipoise) to about 40 Pa·s (40,000 centipoise) at 25° C. (77° F.), and more particularly from about 3 Pa·s (3,000 centipoise) to about 12 Pa·s (12,000 centipoise), and most desirably from about 3 Pa·s (3,000 centipoise) to about 6 Pa·s (6,000 centipoise). When the base resin is bisphenol A and the diluent is butylglycidyl ether, a preferred amount of the diluent is from about 5 to about 15; preferably from about 8 to about 12; and most preferably from about 6 to about 10 parts by weight per 100 parts by weight of the epoxy base resin. The amount of the diluent added will also depend upon the amount appropriate for the addition of the pigmentation.

Since the width of the base layer can be wider than the binder layer, it is desirable that a dark color, such as dark blue, dark green, dark violet, or black, be utilized to form a contrasting color with the lighter binder layer. Fillers are desirably utilized such as clay, talc, blast slag, and carbon black in sufficient amounts to yield a dark overall appearance. Fillers that are not dark, such as talc, etc., can be mixed with suitable darkening pigments such as carbon black, black iron oxide, and the like. Suitable amounts of fillers and pigments can be utilized to generate a sufficient dark color in amounts up to saturation of the base layer such as an epoxy resin.

While not desired, at times a light colored base layer can be used which generally includes fillers or pigments such as white, yellow, red, blue, green, and the like. A white base color can be achieved by utilizing white pigment such has titanium dioxide; yellow can be achieved by utilizing cadmium yellow, nickel titanium yellow, chrome titanium yellow; red can be achieved by utilizing cadmium red, or red iron oxide; blue can be achieved by utilizing cobalt blue or ultramarine blue; green can be achieved by utilizing cobalt green, or chrome oxide green, and the like. As with the dark pigments, the amount of white pigments can be utilized up to the saturation of the base resin. As with the dark pigment fillers and/or pigments, the amount of the light colored fillers and/or pigment can also be up to the amount of saturation of the base resin. Optionally fluorescent and phosphorescent pigments can also be employed. Different pigments can be used in different layers. Of course, alternatively the epoxy can be clear, such as for a clear primer.

As noted above, an epoxy base layer is preferred. However, the base layer may be a poly(vinyl ester), a polyester, an acrylic polymer, a polyurethane, a polyurea, or a polyurethane urea.

Other conventional additives known to the art and to the literature can be utilized such as, for example, catalysts-accelerators, at least one thixotropic agent an example being amorphous fumed silica, a defoamer, a heat and light stabilizer, a wetting and dispersing agent, an antioxidant, and the like.

A hardener system is combined with the epoxy resin in order to produce the resultant epoxy composition. In the present invention, the hardener system utilizes one or more hardeners which could be an aliphatic or aromatic amine, an amidoamine, an amine adduct, a cycloaliphatic amine, an anhydride, or a mercaptan hardener. Examples of suitable polysulfides and mercaptans are LP3® sold by Toray Industries, and Capcure® 3800 and Capcure® WR6 sold by Cognis. It is preferable that the hardener is one or more amine hardeners that are either aromatic and/or aliphatic as set forth in U.S. Pat. No. 5,340,652 hereby fully incorporated by reference. Suitable aromatic hardeners include, for example, methylene dianiline, diaminodiphenylsulphone, aromatic polyamine adducts based on methylene dianiline, modified aromatic adducts based on methylene dianiline and modified methylene dianiline, and m-phenylendiamine, its adducts and derivatives and polyamines, while aliphatic hardeners include alkyl, cycloaliphatic and heterocyclic amines, and their adducts and derivatives. The hardener system preferably includes more than one hardener compound and in a more preferred embodiment includes at least three compounds.

Thus, when the system includes a two component system, the system may be about 10 to about 90 percent by weight of a first hardener and about 10 to about 90 percent by weight of a second hardener based on the total weight of both hardeners. When the system has three or more hardeners, the system has about 5 to about 90 percent of a first hardener, about 5 to about 90 percent of a second hardener, and from about 5 to about 90 percent of a third hardener. In an alternative embodiment, these amine hardeners are predominately, if not exclusively, aliphatic. The amine hardeners are used in an amount so that the gram equivalent ratio of the amine functionality to the epoxide functionality of the epoxy system is from about 0.75 to about 1.05, and more preferably from about 0.9 to about 1.0. In the present application, it is preferable that three amine hardeners are used in combination in the hardener system. In particular, when the epoxy is used with a white formulation, it may be preferable that these hardeners are at least substantially aliphatic amines since aromatic amines tend to discolor.

In a preferred embodiment, the first hardener amine (a) is a combination of an alkylphenol and a aliphatic amine which is an amino-alkyl cyclodiamine having the general formula

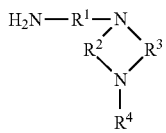

wherein $R^1$ is an alkyl having 1 to 20 carbon atoms, and preferably 1 to 8 carbon atoms; and $R^2$ and $R^3$, independently, form a heterocyclic alkyl each having 1 to 15 carbon atoms, and preferably 1 to 8 carbon atoms; $R^4$ is hydrogen or $R^5NH_2$ or $R^6NHR^7$, where $R^5$ is alkyl $C_1$ and $C_{10}$ and preferably $C_1$ to $C_3$, $R^6$ is alkyl $C_1$ to $C_{10}$ and preferably $C_1$ to $C_3$, and $R^7$ is alkyl $C_1$ to $C_{10}$ and preferably $C_1$ to $C_3$. An example of a preferred cycloamine is amino ethyl piperazine or bis-amino propyl piperazine. A commercial example of this is Ancamine® 1644 sold by Air Products. This aliphatic amine is activated or modified, meaning that it is combined with an alkyl phenol having a 1 to 15 carbon alkyl, and preferably a 1 to 9 carbon alkyl, such as nonyl phenol. The combination may also be an amine adduct.

The second amine hardener (b) is again a combination of an aliphatic amine with a phenol and/or an epoxy resin. The aliphatic amine could be an amine adduct. In this case the amine is a poly generic amine having the general formula

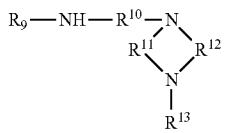

where $R^8$ is $(CH_2)_n$, where n is 1 or 2 to 30 and preferably about 2 to 12, and x is 1 to 10, preferably about 1 to 4. Preferred amines are diethylene triamine, methylenetetramine, diethylenepropylamine, tetraethylenepentaamine, and particularly preferred amines are diethylene triamine and triethylene tetramine. The phenol may include bisphenol A or bisphenol F and is preferably is bisphenol A. The epoxy resin may include bisphenol A or bisphenol F epoxy resin. Again, the combinations may result in amine adducts. Commercial example of this are Versamine® 908, sold by Cognis and DEI-1®-52, sold by The Dow Chemical Company.

The third amine hardener (c) is preferably an alkyl amino alkyl cyclodiamine having the general formula

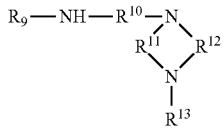

wherein $R^9$ is an alkyl having from about 1 to about 15 carbon atoms, preferably about 1 to about 10, most preferably nonyl; $R^{10}$ is an alkyl having from about 1 to about 15, preferably from about 1 to about 8 (e.g. ethyl); $R^{11}$ and $R^{12}$ together with the two amine functionalities form a heterocyclic alkyl where $R^{11}$ and $R^{12}$, independently, each have from about 1 to about 15 and preferably from 1 to about 4 carbon atoms; where $R^{13}$ is hydrogen, or $R^{14}H_2$ or $R^{15}NHR^{16}$; where $R^{14}$ is alkyl $C_1$ to $C_{10}$, and preferably $C_1$ to $C_3$; $R^{15}$ is alkyl $C_1$ to $C_{10}$, and preferably $C_1$ to $C_3$; and $R^{16}$ is alkyl $C_1$ to $C_{10}$, and preferably $C_1$ to $C_3$. A preferred example is n-aminoethylpiperazine, the commercial equivalent being DEH®-39, sold by The Dow Chemical Company.

The preferred amine hardeners are used in combination where, by weight, the first amine hardener (a) is from about 15 to about 40 percent, preferably from about 27 to about 37 percent, and most preferably from about 29 to about 34 percent; the second amine hardener (b) is from about 45 to about 60 percent, preferably from about 46 to about 56 percent, and most preferably from about 49 to about 53 percent, and the third amine hardener (c) is from about 10 to about 25 percent, preferably from about 12 to about 22 percent, and most preferably from about 15 to about 20 percent; all of the foregoing percentages being by weight based on the total weight of a+b+c.

The hardener system desirably includes other additives such as ultraviolet light stabilizers and antioxidants. UV stabilizers include hydroxyphenylbenzotriazoles, hydroxybenzophenones, hydroxyphenyl-S-triazines and oxalic anilides. Antioxidants include sterically hindered phenols, organophosphites, thioesters and tertiary amines. UV stabilizers and antioxidants are available from Ciba Speciality Chemicals or Cytec Industries; examples are Tinuvin® 292, Tinuvin® 1130, Irganox® 1010, Irgafos® 168, Cyasorb® UV-1164L, Cyanox® 1790.

The total hardener in the system is from about 5 to about 90 percent and more narrowly from about 10 to about 70 percent. The remainder to equal 100 percent being the other additives. A desired additive is a catalyst that is generally a dicarboxylic acid and is preferably salicylic acid. It is used in an amount of from about 2 to about 10, and preferably from about 3.5 to about 5.5 parts by weight per 100 parts by weight of amine hardener system a+b+c.

A plasticizer may be used in the hardener system. Examples include a high boiling alcohol such as the aromatic alcohols, including for example, benzyl alcohol which has a boiling point of 205° C. (401° F.). This is used in an amount of from about 5 to about 25; and preferably from about 10 to about 20, most preferably from about 15 to about 20 parts by weight per 100 parts of amine hardener system (i.e. based on the total weight of a+b+c). Further, a thixotropic agent may be used in an amount to achieve the desirable viscosity which is from about 3 Pa·s (3,000 centipoise) to about 8 Pa·s (8,000 centipoise). This thixotropic agent is preferably fumed silica or silicon dioxide. It is added in an amount of from about 0.5 to about 5 parts; preferably from about 1 to about 4 parts by weight per 100 parts amine hardener system (a+b+c).

The hardener system is applied to the epoxy resin system to cure the same and achieve a cured viscosity of from about 3 Pa·s (3,000 centipoise) to about 20 Pa·s (20,000 centipoise), as well as various physical properties such as compression set and tensile elongation. It is desirable that the compressive strength is at least about 34.43 megapascal (5,000 psi), and desirably from about 82.74 megapascal (12,000 psi) to about 96.53 megapascal (14,000 psi) as determined by ASTM D695, and the tensile strength is at least about 34.43 megapascal (5,000 psi), and more preferably at least about 41.37 megapascal (6000 psi) up to about 68.45 megapascal (10,000 psi) as determined by ASTM D-638.

The one or more weather resistant binder layers are generally independently formed on a portion or upon the total surface area of the base resin layer. Each binder layer is formulated to provide, when cured and dried, good adhesion to the base layer, or to another weather resistant binder layer, as well as to protective media compounds and/or to reflective compounds, or any combination thereof. Examples of suitable polymers for the weather resistant layer include, but are not limited to polyurethanes, polyurethane-ureas, polyureas, polyesters, acrylics (i.e. polymethylmethacrylate and copolymers) and the like. Such polymers or resins are well known to the art and to the literature. The various one or more weather resistant layers furthermore are not transparent, that is they transmit generally about 10 percent or less of the light incident thereon, desirably less than about 5 percent of the light incident thereon, and preferably less than about 1 percent of the light thereon with no transmission of any light therethrough being highly preferred. In other words, the weather resistant binder layers of the present invention are opaque, that is substantially free or totally free of any light transmission therethrough. The one or more weather resistant layers thus have no refractive index. The weather resistant binder layers of the present invention have little or no change in properties when subjected to accelerated weathering tests such as QUV in accordance with ASTM G-154. They also have a yellow index of less than about 10 at 600 hours according to ASTM D-1925.

When a polyurea or polyurethane is used as the weather resistant binder layer, the urethane composition is generally a liquid at ambient temperature, for example from about 10° C. (50° F.) to about 40° C. (104° F.), and preferably from about 15° C. (59° F.) to about 30° C. (86° F.). It is an important aspect of the present invention that the urethane composition be volatile-free, that is, generally contains less than about 10 percent by weight of volatiles therein, such as a solvent, desirably less than about 5 percent or less than about 1 percent by weight, and preferably no volatiles at all. Such compositions are generally described as a 100 percent solids composition. Another definition of the 100 percent volatile-free urethane system is that the system, before reaction, does not contain any components which have a boiling point of less than about 48.9° C. (120° F.) or at about 65.6° C. (150° F.) even though it may be liquid. The urethane composition is the reaction of a two-part or component system that is generally an intermediate component and a polyisocyanate component. Whenever it is desirable to prevent yellowing of the urethane composition, all components and compounds thereof are preferably aliphatic.

Considering the urethane intermediate component system, it can be a hydroxyl terminated lactone intermediate, and/or a hydroxyl terminated polyether, polyester, or a polyether-ester intermediate. The lactone based hydroxyl terminated compound can either be difunctional, trifunctional, tetrafunctional, or combinations thereof, for example, blends of a difunctional lactone based intermediate and a trifunctional based lactone intermediate, or the like. Hence, a lactone intermediate can have from about 2.0 to about 4.0 or preferably to about 3.0 hydroxyl groups per molecule. The hydroxyl terminated lactone intermediate is made from a lactone generally having from about 4 to about 8 carbon atoms, with 6 carbons that are caprolactone, being preferred. The lactone is typically reacted with a diol generally having from about 2 to about 8 carbon atoms and preferably from about 2 to about 6 carbon atoms to form the hydroxyl terminated lactone intermediate. Specific examples of such diols include ethylene glycol, propylene glycol, butylene glycol, such as 1,4-butane diol, hexamethylene glycol, and the like, with 1,4-butane diol being preferred. When either in combination with a diol, or when used by itself, a lactone triol intermediate can be generally made from a triol having from about 3 to about 12 carbon atoms, desirably from about 5 to about 8 carbon atoms, with specific examples including glycerol, trimethylol propane, and the like. A preferred triol is 2-ethyl-2-(hydroxymethyl)1,3-propane diol, i.e., trimethylol propane. Similarly, various tetraols known to the art and to the literature can be utilized to make the lactone polyol intermediate.

Inasmuch as desirably the lactone-based diol or triol intermediate is a liquid at ambient temperature, it generally has a low number average molecular weight as from about 200 to about 1,000, and desirably from about 275 to about 450. Alternatively, a solid lactone intermediate may be used if it is heated above its melting point, and uniformly dispersed prior to application. However, for ease of application, the lactone is preferably a liquid at ambient temperature.

In lieu of the polylactone intermediate, or in combination therewith, a polyol intermediate can be utilized which can either be a polyester polyol, a polyether polyol, or a polyester-ether polyol intermediate. These polyol intermediates are solvent-free. The polyether intermediate is generally made from oxyalkylene compounds having from about 2 to about 6 carbon atoms and preferably about 2 or about 3 carbon atoms, i.e. specific examples include ethylene oxide, propylene oxide, butylene oxide, and the like, with ethylene oxide and propylene oxide being preferred. The ester intermediate is generally made from glycols or triols having from about 2 to about 10 and desirably from about 2 to about 6 carbon atoms, with specific examples including ethylene glycol, propylene glycol, butylene glycol, hexamethylene glycol, trimethanol propane, and the like, with ethylene glycol and propylene glycol being preferred. The polycarboxylic acids such as a tri- or preferably dicarboxylic acids are utilized to form the ester intermediate is an aliphatic or cycloaliphatic generally containing from about 2 to about 12 carbon atoms or aromatic acids generally containing from about 8 to about 20 carbon atoms with specific examples including succinic acid, glutaric acid, adipic acid, pimelic acid, azelaic acid, phthalic acid, diphenolic acid, and the like, with adipic acid and succinic acid being preferred. Although a polyether polyol or a polyester polyol can be utilized, preferably a polyester-ether intermediate is utilized made from the above ester and ether forming polyol compounds and preferably a branched polyester-ether intermediate is utilized desirably having at least two hydroxyl end groups therein. Desirably, the mixed polyester-ether is multifunctional as containing from about 2.0 to about 3.0 hydroxyl groups therein and preferably is trifunctional. An example of a preferred mixed polyester-ether branch polyol intermediate is Desmophen™ 1155 manufactured by Bayer MaterialScience. This intermediate has a hydroxy number of approximately 168 and an equivalent weight of about 333. The equivalent weight of the polyether, the polyester, or the polyether-ester intermediate is generally from about 190 to about 500 and preferably from about 300 to about 400.

The total amount of the various one or more polyol intermediates is generally from about 30 to about 75 parts by weight, desirably from about 40 to about 60 parts, and preferably from about 45 to about 55 parts by weight for every 100 parts by weight of the entire intermediate component.

The lactone based intermediate is preferred. If a polyol intermediate is also utilized, the amount thereof is up to about 50 percent; preferably up to about 10 percent; and most preferably up to about 6 percent by weight based upon the total weight of the polyol intermediate and the lactone intermediate.

The intermediate component also generally has a significant amount of one or more chain extenders which generally imparts stiffness to reacted urethane composition. Such chain extenders can be diols, triols, etc. having from about 2 to about 15 carbon atoms and preferably from about 2 to about 6 carbon atoms with specific examples including ethylene glycol, propylene glycol, butane diol, dipropylene glycol, diethylene glycol, glycerol, trimethylol propane diol, and the like, with the diols and specifically 1,4-butane diol being preferred.

The amount of the chain extender is generally from about 5 to about 25 parts, and more preferably from about 10 to about 20, and most preferably from about 14 to about 16 parts by weight for every 100 parts by weight of the entire intermediate component.

In addition to the polyol intermediate and the chain extender, optionally but desirably one or more water or moisture scavengers is utilized to generally provide a moisture free composition. Such moisture scavengers are generally known to the art as well as to the literature. A particular suitable moisture scavenger has been found to be a latent aliphatic polyamine which are generally the reaction of a diisocyanate with a hydroxyl terminated oxazolidine, such as

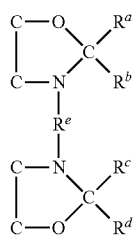

wherein $R^a$ $R^b$ $R^c$ $R^d$ and $R^e$, independently, are alkyl having from 1 to 6 carbon atoms, and the diisocyanate is $R(NCO)_2$, wherein R is an aliphatic or an aromatic, or combinations thereof, generally having from about 2 to about 20 carbon atoms with specific examples including isophorone diisocyanate, hydrogenated diphenylmethane diisocyanate (HMDI), hexamethylene diisocyanate (HDI), toluene diisocyanate, and the like, but diphenylmethane diisocyanate (MDI) is generally not utilized. A desirable latent amine moisture scavenger is Hardener Oz® by Bayer MaterialScience. Alternatively, anhydride water scavengers having a total of from 4 to 12 carbon atoms, and alkaline earth salts of such anhydrides, such as methylhexahydro-phthalic anhydride. Other anhydrides include acetic anhydride, propionic anhydride, butyric anhydride, valeric anhydride, hexanoic anhydrided, pivalic anhydride, and the like. Also molecular sieves which are generally crystalline aluminosilicates, crystalline alumino-phosphates, etc. and are dispersed in a carrier oil, can be utilized. A specific example is Unisiv® paste sold by UOP.

The amount of the one or more water scavengers is generally from about 1 to about 8, and preferably from about 2 to about 6 and most preferably about 3.5 to about 4.5 parts by weight for every 100 parts by weight of the entire intermediate component.

The second part of the urethane composition, that is the polyisocyanate component, i.e. $R(NCO)_n$, wherein n is from 1 to about 4 and R can be an aliphatic polyisocyanate wherein R generally contains a total of from about 2 to about 20 carbon atoms and desirably from about 4 to about 10 carbon atoms. Aromatic polyisocyanates, that is aliphatic substituted polyisocyanates such as alkyl substituted polyisocyanates, aromatic substituted aliphatic polyisocyanates, etc. can also be utilized and R generally contains a total of from 6 to about 20 carbon atoms. The polyisocyanate is desirably a diisocyanate, although optionally up to 10 percent by weight of a tri or tetraisocyanate can be utilized. Examples of specific aliphatic diisocyanates include the various isophorone diisocyanates (IPDI), the various hexane diisocyanates such as 1,6-hexane diisocyanate, the various mixed trimethylhexane diisocyanates, the various pentamethylene diisocyanates, and the like. Hexamethylene diisocyanate and isophorone diisocyanate are preferred. The aliphatic polyisocyanates generally have a molecular weight of from about 150 to about 600 and an equivalent weight average of from 80 to about 400. Examples of aromatic diisocyanates include paraphenylene diisocyanate, 4,4'-dibenzyl diisocyanate, dianisidene diisocyanate, meta-phenylene diisocyanate, tolylene diisocyanate, bitolylene diisocyanate, 4,4'-methylenebisphenyl isocyanate (MDI), naphthalene diisocyanate, xylene diisocyanate, and the like with MDI being preferred. The aromatic polyisocyanates generally have a molecular weight of from about 100 to about 700 and an equivalent weight average of from about 80 to about 300. Although aromatic type diisocyanates generally give very good properties, they tend to "yellow" the urethane composition and, hence, in various situations where color or other optical properties are important, the aliphatic polyisocyanates are preferred. The equivalent molecular ratio of NCO to OH of all of the various hydroxyl terminated intermediate compounds and chain extenders, etc., is generally a slight excess as from about 0.9 to about 1.5, desirably from about 1.02 to about 1.15, and preferably from about 1.05 to about 1.10. Ratios outside of this range generally yield a reacted product which is too flexible or too hard.

Various urethane catalysts can be utilized such as dibutyl tin dilaurate, bismuth stearate, bismuth stannate, zinc octate, lead octate, cobalt naphthalates, and the like. The amount of such catalyst is generally small and can range from about 0 to about 2 parts by weight and preferably from about 0.1 to about 0.6 parts by weight for every 100 parts by weight of the hydroxyl containing intermediate component. In addition to promoting the reaction, the catalyst permit rapid cure at ambient temperature.

In addition to or in lieu of polyurethanes, various polyurethane-urea polymers can be utilized. Polyurethane-urea polymers are generally made from polyurethanes in which an excess of the diisocyanate has been utilized which reacts with the urethane to produce an allophanate which then reacts with a diisocyanate such as toluene diisocyanate to yield a polyurethane-urea polymer. Polyureas can be obtained by the reaction of a diamine such as hexylmethylene diamine with a diisocyanate. Such polyurethane-urea polymers and polyurea polymers per se are well known to the art and to the literature with respect to the production thereof and the various types of specific polymers. The various polyurethanes, polyureas, and polyurethane-urea polymers of the present invention are preferred with respect to the weather resistant binder layer. As an example of the preparation of a specific polyurethane-urea the following procedure may be used:

For example, to a mixing vessel are added a polyaspartic amine (Desmophen® 1420, (50.5 lbs)), trimethylolpropane-caprolactone polyols (Tone® 301, (47.6 lbs) and Tone® 310, (10.9 lbs)), urethane bisoxazolidine (Hardener Oz® (3.1 lbs)), defoamer (Byk® 501, (1.2 lbs)), dibutyltindilaurate (T-12, (0.5 lbs)), and the resulting mixture is mixed for about 10 to 15 minutes at high speed. To the resulting mixture is added molecular sieves (UOP® L Powder, (4.3 lbs)) and mixed for another 10 minutes. Finally titanium dioxide (TR®-60, (79.8 lbs)), thixotrope (Aerosil® 200, (0.3 lbs) and aminosilane (A1100, (2.0 lbs)) are added and mixed for 8 minutes. The mixture from above is reacted with one equivalent of polymeric 1,6-hexamethylenediisocyanate (Desmodur® N3200). The gel time for 100 grams mixed material is less than 2 minutes at 25° C. and the following physical properties may be observed after 7 day cure: tensile strength 13.79 megapascals (2000 psi) (ASTM D-638), abrasion resistance <40 mg (ASTM C-501), and shore D 70 (ASTM D-2240).

The various polyesters that can be utilized are generally conventional and the preparation thereof as well as the specific types of polymers are well known to the art and to the literature. Such polyesters are generally produced by the reaction of one or more diols with one or more carboxylic acids having from about 2 to about 12 carbon atoms. Examples of specific polyesters includes CAPA® 2077, CAPA® 3091 and Oxymer® M112 made by Perstorp Group and Fomrez® 1066-187 and Fomrez® 1066-560 made by Chemtura Corporation.

The various acrylics that can be utilized are also well known to the art and to the literature and are derived from acrylic acid or a methacrylic acid and preferably are esters thereof wherein the ester portion is derived from a carboxylic acid having from about 2 to about 10 carbon atoms. Specific examples of acrylics include polymethacrylate, poly(methyl methacrylate), polyacrylamide, and the like.

While the above-noted weather resistant binder layers can be utilized, it is an aspect of the present invention that the binder layer is not the same as the base layer. Thus, when the base layer is a polyurethane, the binder layer is other than a polyurethane. As noted above, inasmuch as the highly preferred base layer is an epoxy resin, the weather resistant binder layer is generally one of the above noted polymers.

Various conventional additives in suitable amounts can be utilized in the intermediate component. Such additives include fillers such as clays, silicas, and the like, various antioxidants, various ultraviolet light inhibitors, air release agents, levelling agents, wetting agents, and the like, as well as pigments. With regard to road lane markers, the pigments utilized are generally titanium dioxide for white, carbon or iron oxide for black, cadmium yellow, nickel titanium yellow, Hansa® yellow, or chrome titanium yellow for a yellow pigment, cadmium red or iron oxide red for a red pigment, cobalt blue or ultramarine blue for a blue pigment, cobalt green or chrome oxide green for a green pigment, and the like.

The base layer and the one or more weather resistant binder layers as noted above, are generally utilized as a laminate or layer system to form an article having good binding strength to a substrate as well as good weatherability of the upper layers of the laminate that preferably serves as a road marker. The articles or laminates of the present invention can be utilized as protective coatings for any of various substrate materials including, but not limited to, asphalt, concrete, and metal surfaces. Although the preferred use for the articles of the present invention is as road lane markers, the articles can be utilized on additional structures, such as steel structures, storage tanks, decks and the like.

In one embodiment, the base layer is applied to the surface or substrate to be treated or coated in any conventional manner such as by brushing, spraying, rolling, or the like. It is preferred that the application is done by plural component spray apparatus. The base layer can either by a one-part or two-part system, with a two-part system epoxy being preferred with the two parts being mixed together in any conventional manner before and/or during application and cured at ambient temperature, e.g. from about 0° C. (32° F.) to about 60° C. (140° F.), and desirably from about 4.4° C. (40° F.) to about 48.89° C. (120° F.). The thickness of the base layer will vary depending upon the substrate to be coated as well as the desired degree of protection sought. In the case of an embodiment of a road lane marker, the total thickness of the one or more base layers after application and curing ranges generally from about 0.127 mm (5 mils) to about 0.762 mm (30 mils), and desirably from about 0.254 mm (10 mils) to about 0.508 mm (20 mils).

In a similar manner, each of the one or more binder layers can be applied to the entire substrate and/or a portion of the base layer in any conventional layer, such as described hereinabove. A binder layer is generally applied to a portion or to the entire upper surface of a previously applied base layer, or to a portion or to the entire upper surface of a previously applied binder layer, or any combination thereof. The total thickness of the one or more cured binder layers can vary, independently, and generally ranges from about 0.127 mm (5 mils) to about 0.762 mm (30 mils), desirably from about 0.254 mm (10 mils) to about 0.508 mm (20 mils). The total thickness of the laminate is desirable about 1.27 mm (50 mils) or less.

Each one or more binder layer can be a single part or a two-part system, generally liquid, and preferably applied under pressure. In the case of the two-part system, the separate components are mixed before or during application, or both. The one or more binder layers are cured at the same ambient temperature as the one or more base layers. Moreover, the one or more binder layers generally do not have and preferably are free of any elongated protuberances on the upper or outer most surface thereof.

When a two-part system is utilized for either the base layer or one or more binder layers, or both, upon mixing of the components, which are generally liquid and solvent-free, a reaction generally immediately begins at ambient temperature. Accordingly, it is desirable that in actual practice, the two-part system can be contained in separate tanks, such as on a vehicle, which are mixed under high pressure, and immediately applied thereafter to the intended surface in order to form a portion of a road lane marker or other article.

In a preferred embodiment, each one or more weather resistant binder layers is applied to a preceding layer, either is a base layer or another binder layer, while the preceding layer is still tacky, or otherwise not fully cured. Thereby, ambient temperature curing of the base layer and the one or more binder layers is performed. When the one or more binder layers are applied to the base layer or a preceding binder layer or layers, co-mingling or bleeding of the respective compositions may occur. Thus, a strong mechanical and chemical bond is formed between the layers.

In an embodiment where the road lane marker is adapted to be applied to a road, the base layer composition can be applied by a first vehicle and a binder layer can be applied by a second vehicle. Alternatively, the one or more base layers and the one or more binder layers can be contained on the same vehicle that first applies the one or more base layers and thereafter applies the one or more binder layers.

As the articles of the present invention are preferably road lane markers, the article desirably has high nighttime and wet reflectivity. In one embodiment, the desired reflectivity is obtained by the use of one or more types of reflective compounds. It is preferred that the reflective compounds are present on the exposed surface of the one or more weather resistant binder layers. The reflective particles or compounds are applied entirely or partially on an exposed surface of a desired layer, such as by dropping, gravity fed, sprinkling, or the like, while the layer is still wet and not fully cured. After application of the binder layer upon a surface generally up to about 10 seconds results generally results in the reflective particles being embedded in the binder layer in an amount from about 3 to about 70 percent of the maximum diameter or largest dimension thereof, and preferably from about 40 to about 50 percent of the maximum diameter or largest dimension thereof.

Reflective compounds known in the art are formed from materials including, but not limited to various glasses (preferred), ceramics, polymers, silicates, composite particles such as ceramic cores including a glass outer layer, and the like. The reflective particles have an index of refraction of from about 1.2 to about 2.8 and preferably from about 1.5 to about 2.4. High indexes of refraction are desired inasmuch as they give better reflectivity including wet reflectivity. The reflective additives, can be, but are not limited to, reflective microspheres, such as ceramic particles or glass particles. Preferably, the reflective additives comprise glass particles such as those manufactured by Swarco Holdings AG: Megalux® (600-1700 micrometers)-A1, Plus 9® Cluster beads (500-1500 micrometers)-A2, Swarcolux® (75-1400 micrometers)-A3, Reflex® (45-850 Micrometers)-A4 and Potters Industries: Highway safety spheres, Visibead,® Ultra® 1.9, and Visimax®. The refractive index of the glass particles is generally about 1.5 or greater, desirably about 1.9 or greater, and preferably about 2.3 or higher to comprise a wet reflective. Still other reflective compounds suitable for use in the present invention are solid, transparent, ceramic spheroids, comprising at least one crystalline phase containing at least one metal oxide, such as disclosed in U.S. Pat. Nos. 4,564,556 and 4,758,469. The ceramic spheroids can also have an amorphous phase such as silica. The spheroids may be not vitreous and may not have been derived from a melt or mixture of raw materials capable of being brought to a liquid state at high temperatures, like glass. The ceramic spheroids generally have an index of refraction ranging from about 1.4 to about 2.6. The ceramic spheroids can comprise zirconia/alumina/silica and zirconia/silica. Cluster compounds or beads can also be utilized and the same is generally defined as a ceramic matrix containing glass beads therein, such as Swarco Clusters manufactured by Swarco Holdings AG. The reflective particles of the present invention are generally solid, that is they do not have cavities, openings, or the like therein. Hollow particles and particles having cavities, and the like are thus generally excluded from the present invention.

The reflective compounds of the present invention are generally considered reflective or retroreflective and have the ability to reflect or bend back a substantial portion of impinging light, generally in the direction from which it came. In the case of a particle that allows admittance of light, reflection generally occurs by the action of refraction of the light through the upper surface of the particle, reflection from a lower inside surface of the particle, and subsequent refraction of the light as it exits from the upper surface of the particle, back in the direction from which the light came.

The form of the reflective particles is not critical and numerous different shapes of reflective compounds can be utilized including spheres, beads, semi-spheres, cluster beads or other particulates, or the like. The reflective additives are generally applied at a rate of about 0.4882 to about 2.929 kg/sq.m (0.10 lbs to 0.6 lbs of per square foot) of binder and more preferably between about 0.9277 to about 1.562 kg/sq.m (0.19 lbs to 0.32 lbs per square foot). The size and type of reflective additives can be dependent on the substrate as well as the geography. As an example, with reference to the foregoing, a preferred combination could be 20% Plus 9® Cluster beads (500-1500 micrometers), 40% Megalux® (600-1700 micrometers) and 40% Reflex® (45-850 Micrometers). Generally, the reflective particles do not exceed about several millimeters in length. That is, the maximum diameter or largest dimension of the particle, generally ranges from about 0.00127 mm (0.05 mils) to about 0.1778 mm (7 mils), desirably from about 0.00254 mm (0.1 mils) to about 0.1016 mm (4 mils), and preferably from about 0.0127 mm (0.5 mils) to about 0.0508 mm (2 mils). The ceramic or glass particles may be treated with additives to enhance adhesion, flotation and other beneficial properties.

In accordance with the present invention, one or more weather resistant binder layers are provided with a plurality of protective media compounds which increase the durability of the article and can prevent damage to the reflective beads and even the binder layer itself, especially from damage from the blade of a snowplow. The presence and structure of the protective media compounds in the articles of the present invention allow contact of the blade to be substantially borne by the strong, durable protective media compounds, thereby protecting the remainder of the article components.

The protective media suitable for use in the present invention can be formed from hard, abrasive materials such as various metals, polymers, stones or rocks, or other natural or synthetic materials. The protective media can be in the form of particles, spheres or balls, grit, aggregates and the like. Metals include iron or steel, and alloys thereof, such as stainless steel; titanium; molybdenum and silicon carbide. Specific examples of hard, durable polymers include polycarbonates, polymethylmethacrylate and polyamides. Specific examples of stone and rock include granite, any quartz bearing rock such as quartz per se, or quartz sand, and the like. Preferred protective media include stainless steel desirably in the form of spheres or balls, quartz sand, granite, basalt and the like.

The protective media compounds preferably have a larger average particle size, such as an average diameter or larger dimension than that of the reflective compounds. In a preferred embodiment, as with the reflective compounds above, the protective media compounds are conventionally applied entirely or partially on an exposed surface of a desired weather resistant binder layer, and/or on an exposed surface of the base layer, such as by dropping, gravity fed, sprinkling, or the like, while the layer is still wet and not fully cured, and are partially embedded therein in an amount from about 3 to about 70 and preferably from about 40 to about 50 percent of the maximum diameter or largest dimension thereof. The length of the protective media particles such as the maximum diameter or largest dimension of the particle, ranges generally from about 0.508 mm (20 mils) to about 3.175 mm (125 mils), desirably from about 0.762 mm (30 mils) to about 2.54 mm (100 mils), and preferably from about 1.524 mm (60 mils) to about 2.286 mm (90 mils). Depending on the article construction, protective media compounds can be present in one or more surface layers of the article.

The larger particle size allows the protective media particles to extend outwardly from the outer exposed surface of the binder layer a greater distance than the surrounding reflective compounds. A sufficient number of protective media particles are present so that they form a raised surface or series of contact points across which the snowplow blade moves, above the upper surface of the reflective compounds. Since the protective media particles are fewer in number than the reflective compounds and generally disposed in a spaced-apart relationship so that they generally do not interfere with light reflected from the reflective compounds. In some cases, such as when the protective media compounds are polished metal balls, or quartz containing stone, they can contribute to the reflectiveness of the laminate article. The weight ratio of the total number of the one or more different types of protective media particles to the total number of the one or more different type of reflective particles generally ranges from about 1 to about 20, and desirably from about 1 to about 10.

Since one or more base layers can exist and since one or more weather resistant binder layers can exist, and further since the width of a binder layer can be equal to or less than the width of a base layer, numerous combinations of the various laminates or articles exist some of which are set forth hereinbelow. Desirably, one base layer exists with one weather resistant binder layer in contact with and located on top of at least a portion of or on the entire base layer. Thus, the binder layer will have an exposed upper surface. The reflective particles as well as the protective media particles generally reside on the entire or a portion of the exposed weather resistant binder layer, or they can also reside on an exposed portion of the base layer free of any binder layer thereon. The protective media particles can be randomly disposed on one or more binder layers. The protective media particles can also be disposed in a predetermined pattern or arrangement in order to provide the desired result. Obviously, the protective media particles are desirably positioned to maximize visibility of the reflective compounds, while providing a protective barrier for the reflective compounds to prevent from damage, such as from a snowplow blade or the like.

In an embodiment of the present invention, one or more different binder layers are present on a base layer. For example, a first binder layer can be applied to a portion of the base layer and a second binder layer, different from the first binder layer in some respect, can be applied to a different portion of the base layer. Alternatively, the first binder layer can be applied to the base layer so that substantially all of the surface area of the base layer is covered. Afterwards, the second or any other subsequent binder layer is applied to only a portion of the first binder layer. The exposed outer surface of the laminate will thus include both the first binder layer and second binder layer. One or more differences can be present between the two binder layers. For example, the first binder layer can include a different binder polymer than the second binder layer, or the first binder layer is a different color than the second binder layer, or one binder layer is free of reflective particles or contains a greater amount of reflective particles than another binder layer, or one layer includes protective media compounds and another layer is free of protective media compounds or contains less protective media compounds, such as about 50% less, about 75% less or about 80% less. Differences in color can be determined utilizing the CIELAB L*a*b* or Hunter Lab scales.

Figure 2:
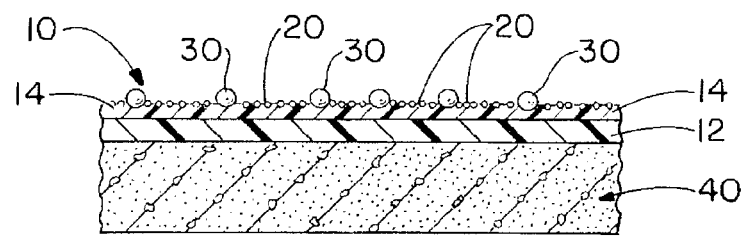
FIG. 2 is a cross-sectional view of the embodiment shown in FIG. 1.

Another embodiment of a reflective article of the present invention is shown in FIGS. 1 and 2. FIG. 1 is a top view showing reflective article 10 bonded to substrate 40 which in this case is a road surface. Base layer 12, as illustrated in FIG. 2, is first applied to substrate 40. Afterwards, a binder layer 14 is applied to base layer 12 before the latter is fully cured. Desirably during curing of the binder layer 14, reflective compounds 20 and protective media compounds 30 are dispersed upon the upper or exposed entire (or partial) surface of binder layer 14. As illustrated in the side view shown in FIG. 2, the reflective compounds 20 and protective media compounds 30 are at least partially embedded in the upper surface of the binder layer 14 and adhere thereto upon curing of the binder layer 14 as described hereinabove. An effective amount of protective media compounds 30 are dispersed in the binder layer 14 to provide an uppermost surface upon which a snowplow blade or the like can travel, as the protective media compounds 30 extend a greater distance or height above the upper surface of reflective compounds 20.

Figure 3:
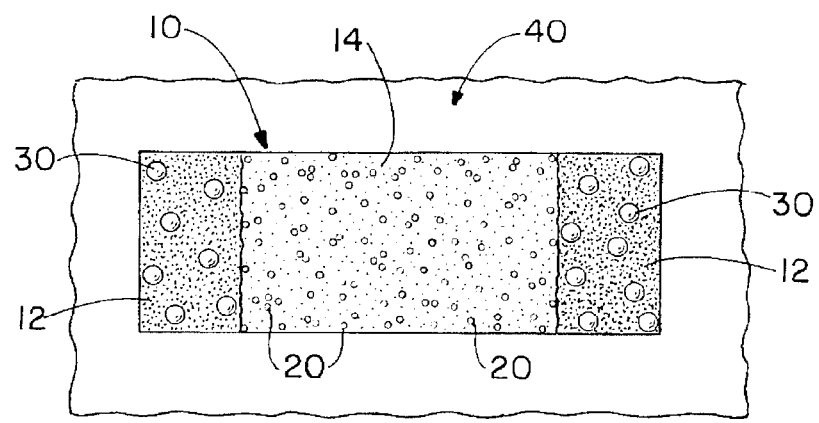
FIG. 3 is a top view of a further embodiment of article, a road lane marker, of the present invention including one preferred arrangement of protective media compounds and reflective compounds shown on a roadway surface.
Figure 4:
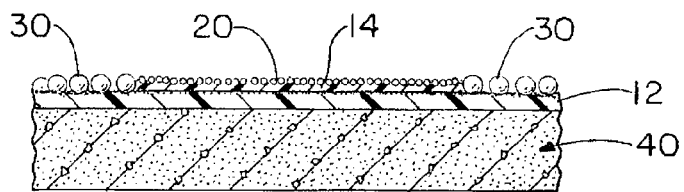
FIG. 4 is a cross-sectional view of the embodiment shown in FIG. 3.

A further embodiment of a preferred reflective article of the present invention is shown in FIGS. 3 and 4. Article 10 includes base layer 12, preferably applied to a substrate 40 such as a road surface as shown in FIG. 4. Binder layer 14 is applied to the central portion, i.e. less than the entire width, of base layer 12, thereby leaving exposed two lateral side surfaces of the base layer, preferably before base layer 12 has fully cured. Thus, binder layer 14 is narrower than base layer 12. Prior to base layer 12 being fully cured, protective media compounds 30 are applied to the lateral side portions of the base layer 12. Reflective compounds 20 are applied to the narrower binder layer 14 before the same is cured. Alternatively and not shown, protective media compounds 30 can be applied to the lateral sides of binder layer 14 with reflective compounds 20 being applied inside of protective media compounds 30, that is to generally the central portion of binder layer 20. Base layer 12 and binder layer 14 have different colors, such as base layer 12 being a black or darker color, and binder layer 14 being a light color, or white, that is lighter than the color of binder layer 14. As illustrated in FIG. 4, protective media compounds 30 have an upper most surface that extends above the upper surface of the binder layer 14 and reflective compounds 20 contained therein, in order to prevent the binder layer 14 and reflective compounds 20 from damage due to a snowplow blade or the like. Moreover, as binder layer 14 is a raised surface, it sheds water, thereby improving wet reflection as ponding of water on the reflective compound particle surfaces is substantially avoided.

Example 1

An experimental lane marker according to the present invention was made. The base layer had a thickness of from 0.305 mm (12 mils) to 0.457 mm (18 mils) and was a diglycidyl ether of bisphenol A hardened with hardeners such as a blend of an adduct of diethylene triamine, a salt of amino ethyl piperazine, and an adduct of triethylene tetramine. The epoxy resin was saturated with blast slag such as Black Beauty® from Reed Minerals. The conformation of the lane marker was that as shown in FIGS. 3 and 4 with stainless steel spheres being located on each lateral side of binder layer 14. The binder layer was either a white or yellow colored polyurethane derived from hexamethylene diisocyanate and a polyester polyol intermediate. The binder layer was white or yellow having a thickness of 0.356 mm (14 mils) to 0.457 mm (18 mils) saturated at the surface with glass beads approximately 0.2441 kg/sq.m (0.05 pounds per square foot) of Plus 9® Cluster beads (500-1500 micrometers), about 0.6347 kg/sq.m (0.13 pounds per square foot) of Megalux® (600-

1700 micrometers) beads, and approximately 0.6347 kg/sq.m (0.13 pounds per square foot) of Swarcolux® (75-1400 micrometers) beads.

The laminate at night was readily visible from an automobile having its regular night lights on.

In accordance with the present invention, one or more binder layers are provided with a plurality of protective media compounds which increase the durability of the article and can prevent damage to the reflective beads and even to the binder layer itself, especially from damage caused by the blade of a snowplow.

In accordance with the patent statutes, the best mode and preferred embodiment have been set forth; the scope of the present invention is not limited thereto, but rather by the scope of the attached claims.

What is claimed is:

1. A reflective marker laminate article, comprising:
   (a) at least one base layer adapted to be applied to a substrate;
   (b) at least one binder layer in contact with and located on top of at least a portion of the at least one base layer; wherein the at least one binder layer is different than the at least one base layer; and wherein the at least one binder layer comprises an exposed uppermost binder layer of the at least one binder layer;
   (c) a plurality of protective media particles; wherein (i) at least a portion of the plurality of protective media particles are partially embedded in at least a portion of the exposed uppermost binder layer of the at least one binder layer, (ii) at least a portion of the at least one base layer comprises an exposed surface free of any binder layer thereon and at least a portion of the plurality of protective media particles are partially embedded in the exposed surface free of any binder layer, or (iii) both (i) and (ii); wherein at least a portion of the plurality of protective media particles have an uppermost surface extending above the uppermost surface of the exposed uppermost binder layer of the at least one binder layer; and
   (d) a plurality of reflective particles; wherein at least a portion of the plurality of reflective particles are partially embedded in at least a portion of the exposed uppermost binder layer; wherein at least a portion of the plurality of reflective particles have an uppermost surface extending above the uppermost surface of the exposed uppermost binder layer of the at least one binder layer; and wherein the uppermost surface of at least a portion of the plurality of protective media particles extend above the uppermost surface of the plurality of reflective particles.

2. The reflective marker laminate article of claim 1, wherein the base layer is cured; wherein the base layer comprises an epoxy resin, a polyurethane, a polyurea, a polyurethane-urea, a poly(vinyl ester), or a polyacrylic, or any combination thereof; wherein the at least one binder layer is non-transparent; wherein the at least one binder layer is cured; and wherein the binder layer comprises a polyurethane, a polyurethane-urea, a polyurea, a polyester, or a polyacrylic, or any combination thereof.

3. The reflective marker laminate article of claim 1, wherein the base layer is an epoxy resin; wherein the reflective particles comprise a ceramic, a polymer, a silicate, a composite particle; or a combination thereof; and wherein the protective media particles comprise a metal, a polymer, a stone, a rock, a natural material, or a synthetic material, or a combination thereof.

4. The reflective marker laminate article of claim 3, wherein the epoxy resin base layer is derived from an amine hardener; and wherein the amine hardener comprises at least a first amine hardener (a) and a second amine hardener (b), and the amine hardener (a) is from 10 to 90 percent by weight of a+b and the amine hardener (b) is from 10 to 90 percent by weight of a+b.

5. The reflective marker laminate article of claim 3, wherein the epoxy base layer is derived from at least three amine hardeners; wherein the first amine hardener (a) is from 5 to 90 percent by weight, the second amine hardener (b) is from 5 to 90 percent by weight, and the third amine hardener (c) is from 5 to 90 percent by weight; all percentages being based upon the weight of a+b+c; wherein the first amine hardener comprises a combination of an alkylphenol and an aliphatic amine which is an aminoalkyl cyclodiamine having a general formula:

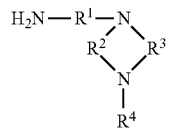

wherein $R^1$ is an alkyl having 1 to 20 carbon atoms, and $R^2$ and $R^3$, independently, have 1 to 15 carbon atoms and together form a heterocyclic alkyl, and where $R^4$ is hydrogen or $R^5NHR^7$ or $R^6NHR^7$, where $R^5$ is an alkyl having 1 to 10 carbon atoms, where $R^6$ and $R^7$, independently, are an alkyl having 1 to 10 carbon atoms, the alkyl group of the alkyl phenol having from 1 to 15 carbon atoms; and wherein the second amine hardener comprises a combination of an aliphatic amine with a phenol, the aliphatic amine comprising a polygeneric amine having the general formula:

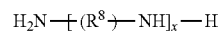

where $R^8$ is $(CH_2)_n$, where n is 1 to 30, x is 1 to 10, and the third amine hardener has the general formula:

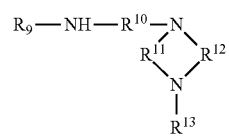

where $R^9$ is an alkyl having 1 to 10 carbon atoms and wherein $R^{10}$ is an alkyl having 1 to 10 carbon atoms, $R^{11}$ and $R^{12}$ independently have from 1 to 15 carbon atoms and $R^{11}$ and $R^{12}$ together with the two amine functionalities form a heterocyclic alkyl where $R^{11}$ and $R^{12}$ are each aliphatic, and $R^{13}$ is hydrogen or $R^{14}NH_2$ or $R^{15}NHR^{16}$, where $R^{14}$ is an alkyl having 1 to 10 carbon atoms, and $R^{15}$ is an alkyl having 1 to 10 carbon atoms, and $R^{16}$ is an alkyl having 1 to 10 carbon atoms.

6. The reflective marker laminate article of claim 3, wherein the epoxy resin is the diglycidyl ether of bisphenol A; wherein a majority by weight of the reflective particles have a diameter of from about 0.0127 mm to about 0.1778 mm; wherein a majority by weight of the protective media particles have a diameter of from about 0.508 mm to about 3.175 mm;

and wherein each the one or more binder layers, independently, is a polyurethane, a polyurea, or a polyurethane-urea.

7. The reflective marker laminate article of claim 6, wherein the epoxy is derived from at least three amine hardeners; wherein the first amine hardener (a) is from about 5 to about 90 percent by weight, the second amine hardener (b) is from about 5 to about 90 percent by weight, and the third amine hardener (c) is from about 5 to about 90 percent by weight; all percentages being based upon the weight of a+b+c.

8. The reflective marker laminate article of claim 6, wherein the reflective particles are solid; wherein the total thickness of the at least one base layer is from about 0.127 mm to about 0.762 mm; and wherein the total thickness of the one or more binder layers is from about 0.127 mm to about 0.762 mm.

9. The reflective marker laminate article of claim 7, wherein the total thickness of the at least one base layer is from about 0.254 mm to about 0.508 mm; wherein the total thickness of the one or more binder layers is from about 0.254 to about 0.508; wherein the uppermost binder layer has a yellow index after 600 hours of about 10 or less as measured according to ASTM D-1925; and wherein the weight ratio of the reflective particles to the protective media particles is from about 1 to about 20.

10. The reflective marker laminate article of claim 1, wherein the substrate is a road.

11. The reflective marker laminate article of claim 1, wherein the at least one binder layer contacts an entire width of the base layer, or contacts less than the entire width of the base layer so that one lateral side of the base layer is exposed or both lateral sides of the base layer are exposed, the at least one binder layer having an exposed surface;
wherein the protective media particles are partially embedded in the at least one binder layer or partially embedded only in the one or both lateral exposed base layer sides;
wherein the reflective particles are partially embedded in the exposed binder layer; and
wherein the base layer comprises an epoxy resin, a polyurethane, a polyurea, a polyurethane-urea, a poly(vinyl ester), or a polyacrylic, or any combination thereof; and
wherein the at least one binder layer comprises a polyurethane, a polyurethane-urea, a polyurea, a polyester, or a polyacrylic, or any combination thereof with the proviso of the at least one binder layer being different than the base layer.

12. The reflective marker laminate article of claim 11, wherein the at least one base layer is a cured epoxy resin; and wherein the at least one binder layer is cured.

13. The reflective marker laminate article of claim 12, wherein the epoxy resin is the diglycidyl ether of bisphenol A; wherein the binder layer is non-transparent and, independently, a polyurethane, a polyurea, or a polyurethane-urea; and wherein a majority by weight of the reflective particles have a diameter of from about 0.00127 mm to about 0.1778 mm; and wherein a majority by weight of the protective media particles have a diameter of from about 0.508 mm to about 3.175 mm.

14. The reflective marker laminate article of claim 13, wherein the reflective particles comprise a ceramic, a polymer, a silicate, a composite particle, or a combination thereof; wherein the protective media comprises a metal, a polymer, a stone, a rock, a natural material, or a synthetic material, or any combination thereof; wherein the reflective particles are solid; wherein the total thickness of the at least one base layer is from about 0.127 mm to about 0.762 mm; and wherein the total thickness of the one or more binder layers is from about 0.127 mm to about 0.762 mm.

15. The reflective marker laminate article of claim 13, wherein the reflective particles are located on an exposed surface of a binder layer; and wherein the protective material particles are located on an exposed surface of the binder layer.

16. The reflective marker laminate article of claim 13, including an exposed lateral portion of the base layer; wherein the reflective particles are located on exposed surface of a binder layer; and wherein the protective media particles are located on the exposed lateral base layer.

* * * * *